United States Patent [19]

Dekker et al.

[11] Patent Number: 5,289,446
[45] Date of Patent: Feb. 22, 1994

[54] DEVICE FOR SCANNING A RECORD CARRIER

[75] Inventors: Anthonius L. J. Dekker, Zürich, Switzerland; Antonius H. M. Akkermans, Eindhoven, Netherlands

[73] Assignee: U.S. Philips Corporation, New York, N.Y.

[21] Appl. No.: 959,813

[22] Filed: Oct. 13, 1992

[30] Foreign Application Priority Data

Oct. 23, 1991 [EP] European Pat. Off. ........ 91202743.0

[51] Int. Cl.$^5$ ............................................. G11B 7/095
[52] U.S. Cl. ............................ 369/44.25; 369/44.320; 369/54
[58] Field of Search ............... 369/44.25, 44.28–44.29, 369/44.32, 44.34, 44.35, 44.36, 54, 58

[56] References Cited

U.S. PATENT DOCUMENTS

| | | | |
|---|---|---|---|
| 4,730,290 | 3/1988 | Takasago et al. | 369/44.25 X |
| 5,018,125 | 5/1991 | Uchikoshi et al. | 369/44.25 |
| 5,179,545 | 1/1993 | Tanaka et al. | 369/44.25 X |

*Primary Examiner*—W. R. Young
*Attorney, Agent, or Firm*—Leroy Eason

[57] ABSTRACT

A device for scanning a record carrier having essentially parallel tracks produces detection signals (AS, . . . , FS) which depend on the location of the scanning point relative to the tracks and from which are derived a tracking error signal (RE) and a track position signal (TP). A comparator (7) detects whether the track position signal intersects a first threshold (D1), and a comparator (6) detects whether the tracking error signal is located within an amplitude window established by a second positive threshold (D2) and a third negative threshold (D3). A signal processor (8) derives a track loss signal from the results of the detections performed by the comparators (6, 7), which track loss signal signifies that the scanning point no longer follows the track. The track loss signal is not produced unless an intersection of the first threshold by the track position signal is detected and, furthermore, the tracking error signal is outside of the amplitude window during a specific time window around such intersection. In this way, momentary disturbances of the detection signals caused by narrow interruptions of the tracks, due to record carrier errors, do not result in erroneous track loss signals.

1 Claim, 3 Drawing Sheets

$$RE = (ES - FS)^*$$

$$TP = (AS + BS + CS + DS)^* - K(ES + FS)^*$$

DEVICE FOR SCANNING A RECORD CARRIER

BACKGROUND OF THE INVENTION

1. Field of the Invention

The invention relates to a device for scanning a record carrier which comprises essentially parallel tracks, the device including a read head for scanning the record carrier, during which operation a scanning point is moved across the record carrier, the read head including a detector for producing detection signals which depend on the position of the scanning point relative to the track. A first signal processor is coupled to receive the detection signal from the read head and derives a tracking error signal and a track position signal, the tracking error signal being indicative of the deviation between the scanning point and the middle of the nearest track over a certain range on either side of each track, and the track position signal indicating whether the scanning point is positioned between two tracks or essentially on a track. The device further includes first comparing means for detecting whether the track position signal exceeds a first threshold, and second comparing means for detecting whether the tracking error signal is situated within an amplitude window established by a second positive threshold and a third negative threshold. A second signal processor derives a track loss signal from the results of the detections performed by the first and second comparing means, which track loss signal denotes that the scanning point no longer follows the track.

2. Description of the Related Art

A device of this type is known from Published International Patent Application No. WO 91/05340. That Application describes an optical scanning device in which the track loss signal is produced when the track position signal, in the form of the envelope of the r.f. read signal, intersects a predetermined threshold and, simultaneously, the tracking error signal is situated outside of the amplitude window.

Although the track loss signal is reliably derived in such prior-art device, it may be erroneously produced in the case of disc errors causing narrow interruptions of the information layer (also known by the German term of "Keil"). A "Keil" may result in a brief disturbance of the detected signals causing substantially simultaneously, the tracking error signal to be outside of the amplitude window and the track position signal intersect the first threshold. Consequently, an erroneous track loss signal is generated.

SUMMARY OF THE INVENTION

It is an object of the invention to provide a record carrier scanning device in which a track loss signal is derived in a more reliable manner than in the prior-art.

This object is achieved with a scanning device as described in the opening paragraph, characterized in that the second signal processor is arranged to produce the track loss signal only if an intersection of the first threshold by the track position signal is detected and, furthermore, the tracking error signal is outside of the amplitude window during a specific time window surrounding the aforesaid intersection.

The invention is based on the realization that when a defect-free section of the record carrier is scanned there is a time window around the intersection instant of the first threshold, due to the limited speed with which the scanning point can be displaced relative to the tracks, during which time window it is impossible to displace the scanning point over such a distance that the associated tracking error signal comes within said amplitude window. By utilizing the time window for deriving the track loss signal one avoids a track loss signal being erroneously generated when defective record carrier sections are scanned.

BRIEF DESCRIPTION OF THE DRAWINGS

The invention will be further explained in the following with reference to the drawing FIGS. 1 to 7, in which.

DESCRIPTION OF THE PREFERRED EMBODIMENTS

Figure 1:
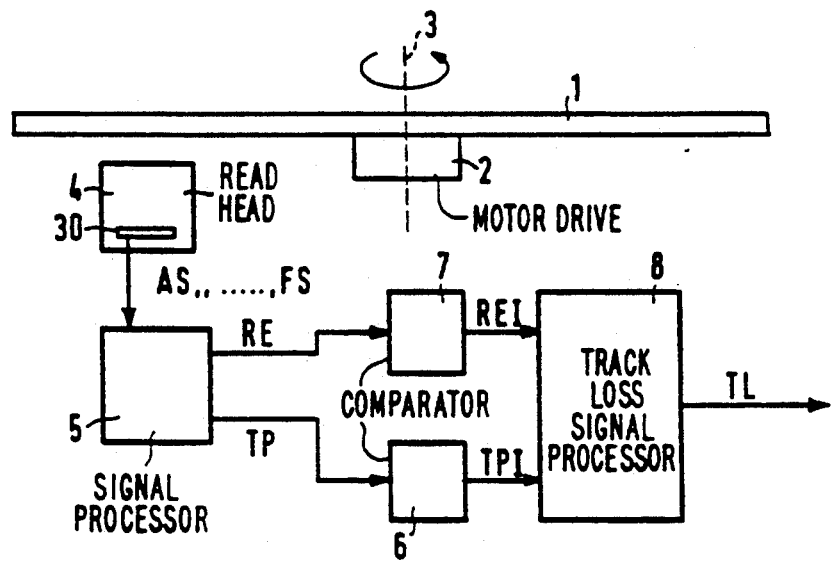
FIG. 1 shows an embodiment of the device according to the invention.
Figure 2A:
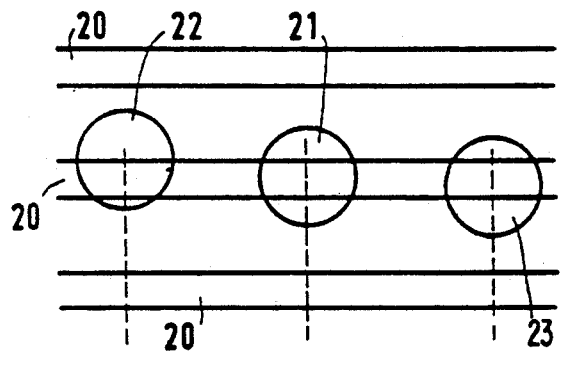
FIG. 2 shows the deriving of a tracking error signal and a track position signal.
Figure 2B:
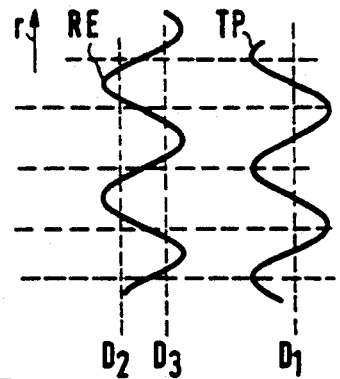
Figure 2C:
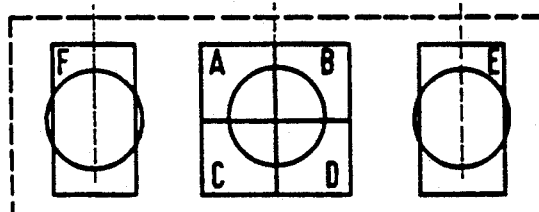

FIG. 1 shows an embodiment of the device according to the invention. A record carrier 1 is in the form of an optically readable disc having a plurality of parallel (concentric) tracks 20 (cf. FIG. 2) and is driven around an axis 3 by a drive motor 2. Opposite to the rotating record carrier 1 is disposed a read head, in this embodiment an optical read head 4 of a customary type. Such an optical read head may be, for example, of a type which scans the record carrier with a reading beam and two auxiliary beams. The beams are focused on the record carrier 1 in a known fashion, the beams being focused to small scanning spots on the record carrier 1. In FIG. 2 the scanning spot produced by the reading beam is denoted by the reference character 21, whilst the scanning spots produced by the auxiliary beams are denoted by the reference characters 22 and 23. The position of the scanning spots 22 and 23 is such that in the case where the centre of the scanning spot 21 coincides with the middle of the track 20, the scanning spots 22 and 23 are disposed slightly shifted to either side of the middle of the track. The beams reflected by the record carrier 1 are focused in known fashion on a radio-sensitive detector 30 which is constituted by a plurality of sub-detectors A,B,C,D,E and F. The detector 30 is arranged so that the reflected auxiliary beams hit the sub-detectors F and E whilst the reflected reading beam hits the group of sub-detectors A,B,C and D. The sub-detectors generate detecting currents AS, ..., FS which are a measure for the amount of radiation received by the sub-detectors. With the aid of a signal processor a tracking error signal RE and a track position signal TP are derived from the low-frequency component (indicated by *) of signals RE and TP, which are derived from the detected signals (AS, ..., FS) in accordance with the following relations:

$$RE = (ES - FS)^*$$

$$TP = (AS + BS + CD + DS)^* - K(ES + FS)^*$$

where K is a constant which is so large that the DC current component of the track position signal TP obtained if the read head is moved in a direction transverse to the tracks is equal to zero. This constant may be determined, for example, when the device is started. During the starting operation, when the read head is moved relative to the tracks, the constant may be adapted so that the track position signal obtained no longer contains a DC current component. A movement of the read head in a direction transverse to the tracks may be obtained by turning off the tracking mode. In that case the tracks will be moved in a radial direction relative to the read head due to the eccentric position of the rotation point relative to the tracks. In FIG. 2 the tracking error signal RE and the track position signal TP are shown as functions of the position r in the middle of the scanning spot 2 (to be termed scanning point hereinafter) relative to the tracks in a direction transverse to the tracks 20. As appears from the drawing Figure, the signals RE and TP as a function of r are two periodic signals phase shifted through 90 degrees relative to one another. In a range of about $\frac{1}{4}$ the track pitch on either one of the two sides of the track centre the tracking error signal is substantially proportional to the distance between the centre of the scanning spot 21 and the middle of the nearest track. The track position signal TP is maximum if the middle of the scanning spot 21 coincides with the middle of a track 20 and the track position signal TP is minimum in the case where the middle of a scanning spot is located midway between two tracks 20, so that the track position signal TP denotes whether the middle of the scanning spot is substantially located on the track or substantially between the tracks. The track position signal TP is fed to a comparator 6 which compares it, in known fashion with a threshold D1 which is situated midway between the maximum and minimum values of the track position signal TP. The comparator 6 produces a binary signal TPI whose edges denote the instants at which the signal TP intersects the threshold D1.

Figure 3:
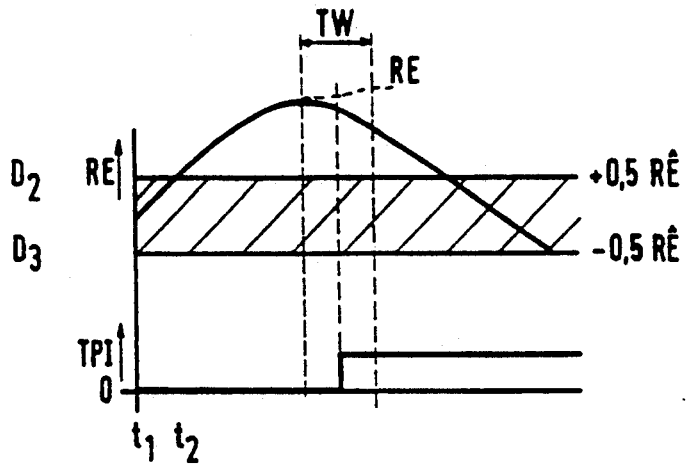
FIGS. 3 and 4 show variation with time of several signals in explanation of the invention.

The tracking error signal RE is fed to a comparator 7 which detects in known fashion whether the value of the signal RE is situated within or outside of an amplitude window established by a positive threshold D2 and a negative threshold D3. The thresholds D2 and D3 may, for example, be equal to half the maximum or minimum value of the focus error signal RE. The comparator 7 produces a binary signal REI which denotes whether the tracking error signal RE is located within or outside of the amplitude window. A singal processor 8 derives from the signals REI and TPI a track loss signal TL which denotes whether the scanning point no longer follows the track. The way in which this is effected will be further explained with reference to the FIGS. 3 and 4. FIG. 3 shows the variation with time of the signals RE and TPI for the case where a defect-free part of the record carrier 1 is scanned whilst the scanning point is moved in a direction transverse to the tracks. At instant t1 the scanning point is substantially in the middle of a track 20. The tracking error signal RE is then substantially equal to zero and the signal TPI has the logic value 0. At the instant t2 the scanning point is so far remote from the middle of the track that the associated tracking error signal RE intersects the threshold D2. At instant t3 the track position signal TP intersects the threshold D1 and, consequently, the logic value of the signal TPI changes from 0 to 1. When the track loss signal TL is derived, there is established whether in a time window TW around the instant t3 at which an intersection of the threshold D2 is detected, the tracking error signal is inside the amplitude window established by D2 and D3. If it is inside this window, it may be assumed that the scanning point no longer follows the track. If it is inside the window, this denotes that the track loss signal RE and the track position signal do not match. For that matter, under normal conditions an intersection of the threshold D1 by the track position signal RP coincides with a maximum or minimum value of the tracking error signal RE. Since the speed of the radial displacement of the scanning point is restricted, it is impossible for the scanning point in the time window TW to be displaced to such an extent that the associated tracking error signal has a value within the amplitude window.

Figure 4:
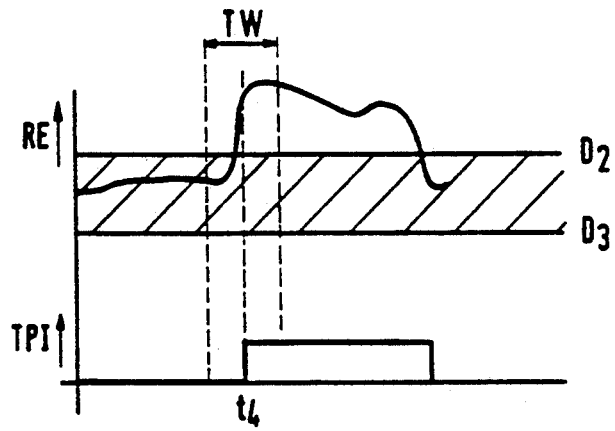

FIG. 4 shows the variation of a tracking error signal RE and the signal TPI as it may occur in the case of a record carrier defect at the scanning point. At the instant t4 the signal TPI denotes that the track position signal TP intersects the threshold D1. Since the tracking error signal RE is inside the amplitude window during the time window TW, it may be assumed that the intersection of the threshold D1 by the track position signal is caused by a record carrier defect and so that the scanning point still actually follows the track and no track loss is established.

It will be evident that the practical implementation of deriving the track loss signal TL may be realised in a number of ways.

Figure 5:
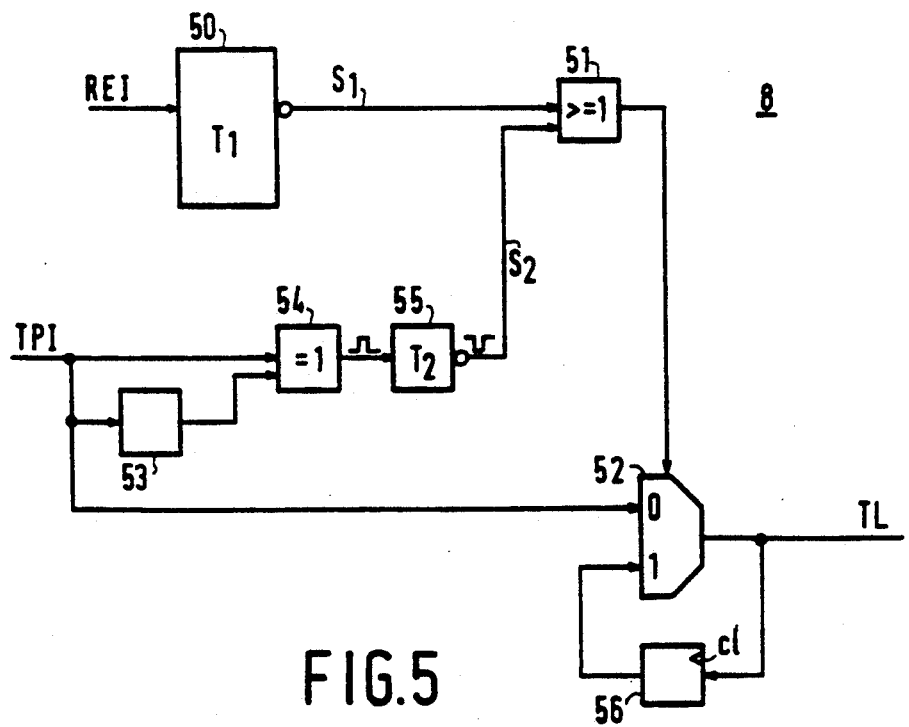
FIG. 5 shows an embodiment of a signal processor to be used in the device according to the invention.

By way of example FIG. 5 shows an optional embodiment of the signal processor 8 for deriving the track loss signal TL in the way described hereinbefore. The circuit 8 comprises a timer circuit 50 to which signal REI is applied. The timer circuit 50 is of a customary type which produces an inverted signal from the signal fed to its input and which maintains to present at its output during a time interval T the output signal (corresponding to the 0 signal at the input) in the case of a 0-1 transistion of the signal fed to its input, before the inverted value of the signal fed to its input is adopted. The output signal of the timer circuit 50, referenced S1, is applied to an input of a dual input NAND gate 51. The output signal of the gate 51 is applied to a control input of a dual input multiplex circuit 52.

The signal TPI is applied to an input of the multiplex circuit 52 which input is selected if the signal on the control circuit of the multiplex circuit has the value of 0. The signal TPI is applied directly and also indirectly via a delay circuit 53 having a very brief delay to a first and a second input of a dual input EXCLUSIVE-OR gate 54. The output of the gate 54 is applied to the second input of the NAND gate 51 via the delay circuit 55 having an inverting output. The delay circuit 55 delays the signal by a period of time interval T2 in length.

The output of the multiplex circuit 52 is applied to an input of the multiplex circuit 52 via a clock-controlled D-flip-flop 56, which input is selected in the case where the signal received at the control circuit of the multiplex circuit 52 has the value of 1. The output signal of the multiplex circuit functions as the track loss signal TL.

The operation of the signal processor 8 will be further explained with reference to the FIGS. 6 and 7.

Figure 6:
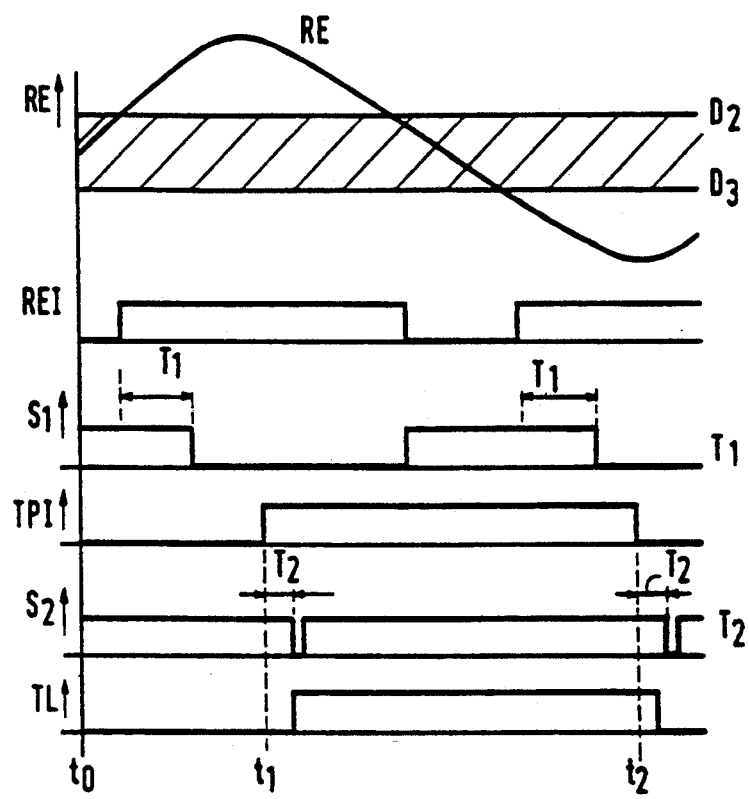
FIGS. 6 and 7 show the variation with time of several signals in explanation of the operation of the signal processor shown in FIG. 5.

FIG. 6 shows the variation with time of the various signals during normal operation in which the defect-free zones of the record carrier are scanned. At instant t0 the scanning point is substantially in the middle of the track 20. In that case the tracking error signal RE will be equal to zero. The signal REI has the logic-0 value.

The signal S1 at the output of the timer circuit has the value of 1. The signal TPI has the value of 0. When the scanning point is moved in radial direction, the tracking error signal RE will increase. Once the tracking error signal RE has departed from the amplitude window established by the thresholds D2 and D3, the logic value of the signal REI will change from 0 to 1. The logic-1 signal at the output of the timer circuit, however, is still maintained for a time interval T1 in length. At instant T1 the logic value of the signal TPI changes from 0 to 1 due to the track position signal TP intersecting the threshold D1, which results in the production of a negative pulse and a pulse delayed by an interval T2 in the output signal S1 of the delay circuit 55. Since the value of the signal S1 is equal to 0 during the negative pulse in the signal S2, this negative pulse will be transferred to the control input of the multiplex circuit by the gate 51. This causes the instantaneous value of the signal TPI to be transferred to the output of the multiplex circuit and loaded in the flip-flop 56. In this manner there is achieved that a detection of an intersection of the threshold D1 by the track position signal causes a track loss signal TL to be generated which denotes by means of the logic-1 value that the scanning point no longer follows the track. In a similar fashion to the one described hereinbefore the track loss signal adopts the value of 0 denoting that the scanning point again follows a track when the next signal value transition occurs at instant t2.

In the embodiment described hereinbefore the size of the time window TW is determined by the time interval T1, whilst the position of the time window relative to the detection of the intersection of the threshold D1 is determined by the delay interval T2.

Figure 7:
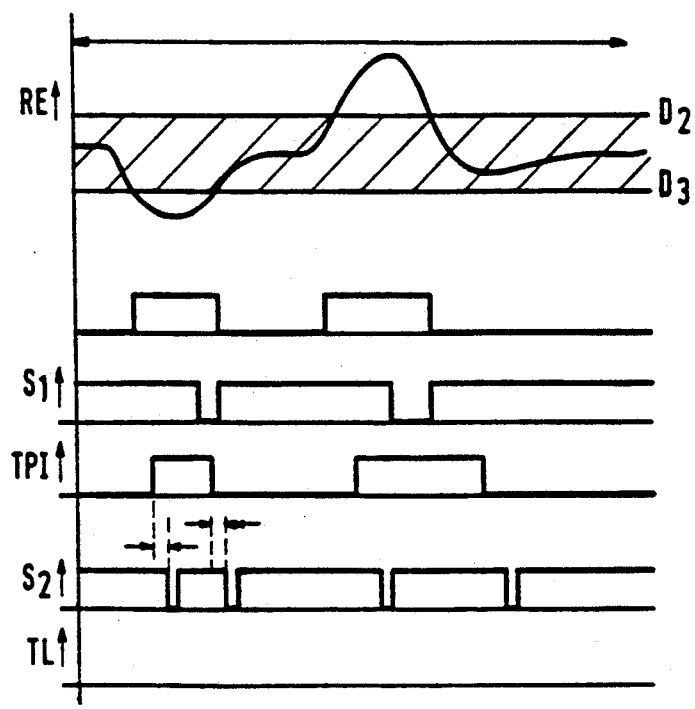

FIG. 7 shows the variation with time of the various signals for the case where a part of the record carrier comprising defects is scanned. Due to these defects the tracking error signal is located outside of the amplitude window established by the thresholds D2 and D3 and intersections occur of the threshold D1 by the track position signal TP. The intersections of the threshold D1 cause negative pulses to be generated in the signal S2 and the output of the delay circuit. However, due to the use of the timer circuit 50 and the delay circuit 54 the generation of these negative pulses coincides with the periods of time in which the signal S1 has the value of 1, so that the negative pulses are not transferred to the control input of the multiplex circuit by the gate 51. The signal value transitions in the signal TPI, which denote the intersections of the threshold D1, thus do not result in improper adaptations of the track loss signal TL at the output of the multiplex circuit.

As already observed hereinbefore, the size and the position of the time window are determined by the values of T1 and T2. The optimum values for T1 and T2 depend on a number of circumstances such as track pitch, scanning speed and so on. Values for T1 and T2 of about 150 $\mu$s and 50 $\mu$s appear to be extremely satisfactory for applications in which a record carrier having a track pitch and scanning speed as laid down in a CD standard is scanned.

The embodiment described hereinbefore relates to an optical scanning of a track according to the so-called 3-spot scanning principle according to which the track to be scanned is scanned not only by a reading beam but also by two auxiliary beams so as to generate a tracking error signal. However, it should be observed that the invention may as well be applied to optical scanning methods in which the tracking error signal and the track position signal are derived exclusively on the basis of the reading beam reflected by the record carrier. Neither is the invention restricted to optical scanning. It may be applied to any scanning method in which a tracking error signal and a track position signal of a type described herein are generated.

What is claimed is:

1. A device for scanning a record carrier having essentially parallel tracks, the device including a read head for scanning the record carrier with a radiation beam focused to a scanning point which is moved across the record carrier, the read head including a detector for producing detection signals which depend on the position of the scanning point relative to the tracks; the device further comprising:

a first signal processor coupled to the read head for deriving from the detection signals a tracking error signal and a track position signal, the tracking error signal being indicative of deviation between the scanning point and the middle of the nearest track over a certain range on either side of such track, and the track position signal indicating whether the scanning point is positioned between two tracks or is essentially on a track;

first comparing means for detecting whether the track position signal exceeds a first threshold;

second comparing means for detecting whether the tracking error signal is situated within an amplitude window established by a second positive threshold and a third negative threshold; and a second signal processor for deriving a track loss signal from the results of the detections performed by the first and second comparing means, which track loss signal denotes that the scanning point no longer follows a track;

characterized in that the second signal processor is adapted to produce the track loss signal only in the case that an intersection of the first threshold by the track position signal is detected and, furthermore, the tracking error signal remains outside of said amplitude window for a specific time window surrounding detection of said intersection.

* * * * *